United States Patent
Lee

(10) Patent No.: US 9,594,456 B2
(45) Date of Patent: **\*Mar. 14, 2017**

(54) BACKGROUND SIGNAL PROCESSING SYSTEM AND BACKGROUND SIGNAL PROCESSING METHOD

(71) Applicants: APEX MATERIAL TECHNOLOGY CORPORATION, Keelung (TW); IMAGINATION BROADWAY LTD., New Taipei (TW)

(72) Inventor: Shang-Li Lee, Taichung (TW)

(73) Assignee: APEX MATERIAL TECHNOLOGY CORP., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,407

(22) Filed: Dec. 19, 2014

(65) Prior Publication Data

US 2016/0179228 A1 Jun. 23, 2016

(51) Int. Cl.
G06F 3/041 (2006.01)
G06F 3/044 (2006.01)

(52) U.S. Cl.
CPC ............ *G06F 3/0418* (2013.01); *G06F 3/044* (2013.01)

(58) Field of Classification Search
CPC .................................. G06F 3/041; G06F 3/044
USPC ..................... 178/18.01–19.07; 345/173–178
See application file for complete search history.

(56) References Cited

U.S. PATENT DOCUMENTS

2015/0268764 A1\* 9/2015 Miyahara ................ G06F 3/044
345/174
2015/0277648 A1\* 10/2015 Small .................... G06F 3/0416
345/174

\* cited by examiner

*Primary Examiner* — Michael Pervan
(74) *Attorney, Agent, or Firm* — Muncy, Geissler, Olds & Lowe, P.C.

(57) ABSTRACT

A background signal processing method and a background signal processing system are provided. The background signal processing method includes: measuring a first background signal measurement value of a first conductive wire group according to a first background signal measurement value to determine whether a subsequent process is required, and measuring a second background signal measurement value of a second conductive wire group if the subsequent process is required, or ending in this step. A background signal speculating value of a third conductive wire group, other than the first conductive wire group and the second conductive wire group, in the conductive wires is calculated according to the second background signal measurement value and the first background signal measurement value. The background signal processing method greatly simplifies the updating steps for background signals, and ensures quality of the captured signals.

8 Claims, 3 Drawing Sheets

BACKGROUND SIGNAL PROCESSING SYSTEM AND BACKGROUND SIGNAL PROCESSING METHOD

BACKGROUND OF THE INVENTION

1. Field of the Invention

The present invention relates to background signal processing technologies, and, more specifically, to a background signal processing method and a background signal processing system used in a touch panel.

2. Description of Related Art

It is necessary to filter out the background noise in order to accurately detect the signal with a touch panel, particularly when used in capacitance type of touch panel, so as to prevent signal distortion. However, the background noise of the sensor is not constant. As a result, it is required to frequently detect the background noise and also update the background noise value, to ensure the quality of signals that are to be captured.

However, with the increasing size of the touch panel, the high precision requirement and so on, the numbers of sensors used in a touch panel must increase, such that the workloads for regularly detecting the background noise and updating information increase. Further, high frequently performing tasks for updating background noise in a system that is overloaded can adversely lower the reading frequency, leading to low performance for the torch panel, such as an interruption of signal when a continuous touch signal is being detected.

On the contrary, signal distortion may be resulted when the frequency of updating background noise is too low, and unaffordable workload for processing and updating background noise can adversely affect the reading frequency. Thus, there is an urgent need for developing a solution for reducing the workload of updating background noise as well as increasing the updating speed, so as to increase the reading frequency of signals.

SUMMARY OF THE INVENTION

In view of the foregoing prior art problems, the present invention provides a background signal processing method and a background signal processing system to reduce the burden of updating background noise so as to increase the speed with the quality assured signals being captured, for increasing the reading frequency of the touch penal frequency.

The present invention provides a background signal processing method, which is used in a sensor device having a plurality of conductive wires and a predetermined background signal threshold, the background signal processing method comprising the following steps of: detecting a first background signal measurement value of a first conductive wire group in the conductive wires according to a first conductive wire number interval, beginning from an $n^{th}$ conductive wire, wherein n is a positive integer; determining whether the first background signal measurement value complies with the predetermined background signal threshold, if yes, stopping in this step, otherwise, detecting a second background signal measurement value of a second conductive wire group in the conductive wires according to the first conductive wire number interval, beginning from an $(n+m)^{th}$ conductive wire, wherein m is a positive integer; and calculating a background signal speculating value of a third conductive wire group in the conductive wires according to the first background signal measurement value and the second background signal measurement value, wherein the third conductive wire group is derived by excluding the first conductive wire group and the second conductive wire group.

The present invention provides a background signal processing system, which is used in a sensor device having a plurality of conductive wires and a predetermined background signal threshold, the background signal processing system comprising: a storage unit that stores the background signal threshold; a measurement unit that detects a background signal measurement value of the conductive wires; and a determination module that determines whether the background signal measurement value complies with the background signal threshold.

Compared with the conventional technology for measuring the background signals of all conductive wires, the present invention provides a background signal processing method and a background signal processing system, which are characterized by measuring sections of all conductive wires: the first conductive wire group to obtain the first background signal measurement value, then determining if a subsequent process is required according to first background signal measurement value, if not the remaining other detection steps can be omitted. This greatly simplifies the updating steps for background signals and reduces the workload; if subsequent processes are required, then the second conductive wire group of all the conductive wires is measured, then the second background signal measurement value obtained and first background signal measurement value obtained prior to that, are used to calculate the background signal speculating value of the third conductive wire group other than the first conductive wire group and the second conductive wire group in the plurality of conductive wires. Since only parts of the conductive wire groups but not all are required to be measured, the total workload is reduced and is able to calculate the remaining background signal speculating value of other conductive wires that are not measured, thereby capable of providing a complete background signal to ensure quality signal can be captured.

DETAILED DESCRIPTION OF THE PREFERRED EMBODIMENTS

The present invention is described in the following with specific embodiments, so that one skilled in the pertinent art can easily understand other advantages and effects of the present invention from the disclosure of the present invention.

Figure 1:
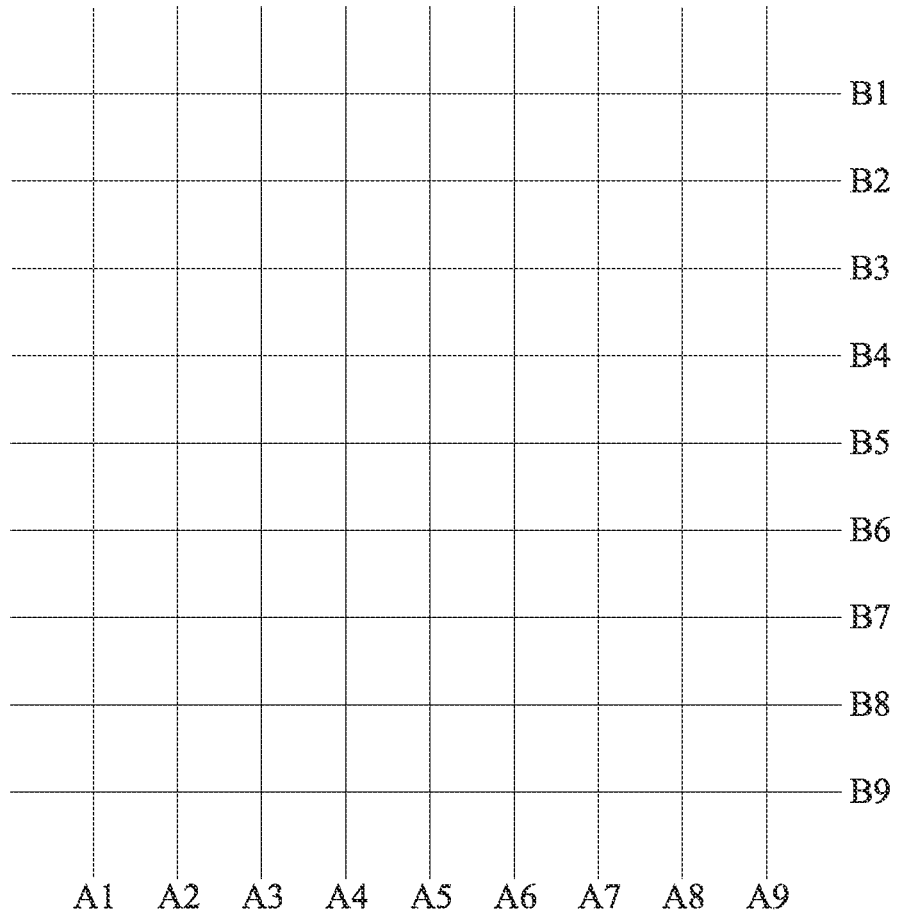
FIG. 1 is a schematic view showing the arrangement of conductive wires applied to a background signal processing method and a background signal processing system according to the present invention.

FIG. 1 is a schematic view showing the arrangement of conductive wires applied to a background signal processing method and a background signal processing system according to the present invention.

The background signal processing method according to the present invention can be applied in a sensor device having a plurality of conductive wires, such as a sensor device used in a touch panel. In an embodiment, the arrangement of a plurality of conductive wires can be used in a touch panel with capacitance type of sensor technology. As shown in FIG. 1, two conductive wire groups each comprise nine conductive wires are arranged in an orthogonal manner. The conductive wires arranged in rows are $A_1$-$A_9$, and the conductive wires arranged in columns are $B_1$-$B_9$. Each of the conductive wires can have both driving and sensing functions.

In an embodiment, the capacitive sensing technology is used to determine the location of the touch control signal. The method of capacitive sensing can be measuring the self capacitance and mutual capacitance from the conductive wires. Take the conductive wires arrangement in FIG. 1, when the self capacitance of the conductive wires $A_1$-$A_9$ are measured, conductive wires $B_1$-$B_9$ are not driven, the sensor function of $A_1$-$A_9$ are respectively used to sensing the self capacitance. On the other hand, when measuring the mutual capacitance, firstly conductive wire $A_1$, then conductive wires $B_1$-$B_9$ are driven, as well as using the sensor function of $A_1$ to sense the mutual capacitance with respect to the conductive wires $B_1$-$B_9$, after that, repeat the same steps for conductive wires $A_2$-$A_9$, respectively to obtain the mutual capacitance of the conductive wire $A_1$-$A_9$ with respect to the conductive wires $B_1$-$B_9$, and so on. Moreover, the background signal processing method and system proposed by the present invention can be simultaneously used for the measuring method for self capacitance and mutual capacitance.

The sensor device may be configured to have a predetermined background signal threshold. In an embodiment, after the sensor device has performed a plurality of (e.g., 10 to 30 times) complete sets of background signal measurement in an isolated electromagnetic compatibility (EMC) environment, a set of background base signal, including the average value and standard deviation of the background signal, is obtained using a static method, which is used as the basis for updating the background signal, and according to the background base signal to determine the background signal threshold, for instance, the threshold can be the absolute value of the difference of the two (or more than two) standard value of the background base signals.

Figure 2:
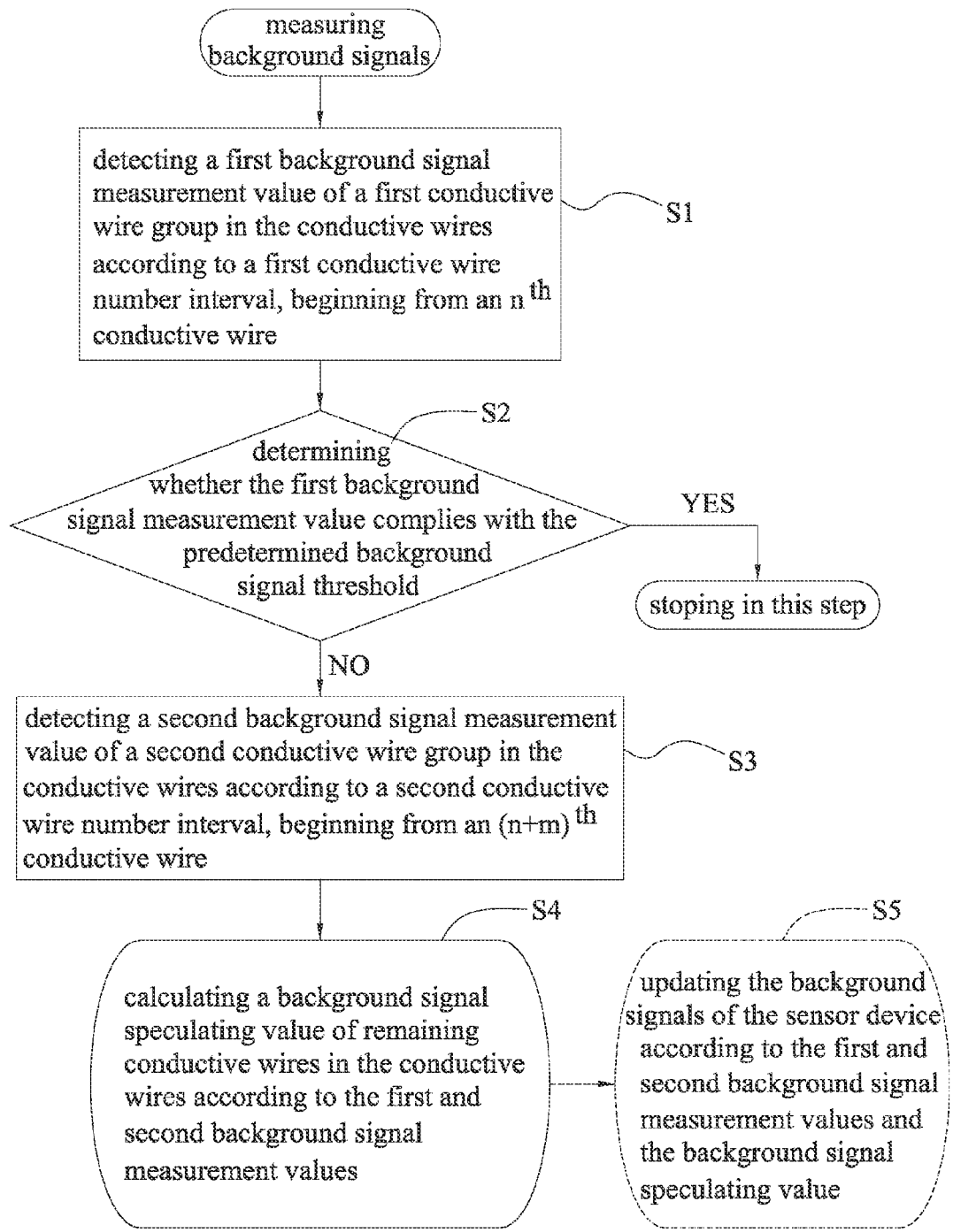
FIG. 2 is a flow chart of a background signal processing method according to the present invention.

FIG. 2 is a flow chart of a background signal processing method according to the present invention. The background signal processing method comprises the following steps of:

(S1) detecting a first background signal measurement value of a first conductive wire group in the conductive wires according to a first conductive wire number interval, beginning from an $n^{th}$ conductive wire, wherein n is a positive integer;

(S2) determining whether the first background signal measurement value complies with the predetermined background signal threshold, if yes, stopping in this step, otherwise proceeding to step (S3);

(S3) detecting a second background signal measurement value of a second conductive wire group in the conductive wires according to the first conductive wire number interval, beginning from an $(n+m)^{th}$ conductive wire, wherein m is a positive integer; and (S4) calculating a background signal speculating value of a third conductive wire group in the conductive wires according to the first background signal measurement value and the second background signal measurement value, wherein the third conductive wire group is derived by excluding the first conductive wire group and the second conductive wire group.

In step (S1), n is a positive integer. Referring to FIGS. 1 and 2, take the configuration that two groups each having 9 conductive wires as an example. As shown in FIG. 1, when the conductive wires $A_1$-$A_9$ are measured, n can be made equal to 1, that is from conductive wire $A_1$, the first conductive wire number interval (for example 4) is used to detect conductive wires $A_1$-$A_9$, i.e., conductive wires $A_1$, $A_5$ and $A_9$, which are in the first conductive wire group, so as to obtain the first background signal measurement value.

In step (S2), the first background signal measurement value is to be determined whether it complies with the predetermined background signal threshold, so as to determine the current first background signal measurement value and whether the difference between the background base signals exceeds the predetermined permissible range. In an embodiment, the background signal threshold can be, but is not limited to, the absolute value of two standard value of the background base signal. When the first background signal measurement value complies with the background signal threshold, it is indicated that the absolute value of the first background signal measurement value is smaller than the background signal threshold. If this condition is met, which means the difference of the background base signals is still within the predetermined permissible range, updating is not required, and the method stops in this step and enters a touch signal detecting mode. If the condition is not met, which means the difference between the base signals exceeds the predetermined permissible range, step (S3) follows.

In step (S3), m is a positive integer, for example 2. As shown in FIG. 1, in the embodiment of n=1, beginning from the $(n+m)^{th}$ conductive wire, i.e., from conductive wire $A_3$, the first conductive wire number interval (for instance 4) is used to detect conductive wires $A_1$-$A_9$, i.e., conductive wires $A_3$ and $A_7$, which are in the second conductive wire group, so as to obtain the second background signal measurement value.

In step (S4), according to the first background signal measurement value measured from conductive wires $A_1$, $A_5$ and $A_9$, and the second background signal measurement value measured from conductive wires $A_3$ and $A_7$, the background signal speculating value of the conductive wires $A_2$, $A_4$, $A_6$ and $A_8$ in the third conductive wire group outside of the $A_1$, $A_5$ and $A_9$ in the first conductive wire group and the $A_3$ and $A_7$ in the second conductive wire group can be obtained.

In the background signal processing method according to the present invention, the background signal measurement value and the speculating value of conductive wires $A_1$-$A_9$ can be obtained, which can be used as a basis to filter out the noise during the touch signal capturing process, so as to ensure quality touch signals being captured. Compared with the prior art, which measures all the conductive wires, the background signal processing method provided by the present invention only measures some of the conductive wires. For instance, only conductive wires $A_1$, $A_3$, $A_5$, $A_7$ and $A_9$ are measured, as compared to all conductive wires in the prior art. In other words, only 5/9 of the conductive wires are measured, thereby greatly reducing the workload for updating the background noise, as well as increasing the updating speed.

In an embodiment, the background signal processing method according to the present invention further comprises step (S5) of updating all of the background signals of the sensor device according to the first background signal measurement value, the second background signal measurement value and the background signal speculating value of the third conductive wire group as the new basis. Then, a touch signal detecting mode can be entered.

In step (S4) of an embodiment, the background signal speculating value of the third conductive wire group is calculated by an interpolation method, such as Lagrange interpolation, Spline interpolation or other interpolation methods. Take the aforementioned embodiment of measuring of the conductive wires $A_1$-$A_9$ as an example, the background signal measurement value of the conductive wires $A_1$ and $A_3$ are used to calculate the background signal speculating value of conductive wire $A_2$ using an linear interpolation method; or use the background signal measurement value of conductive wire $A_3$ and $A_5$, to calculate the background signal speculating value of conductive wire $A_4$ using linear interpolation method, and so on.

Figure 3:
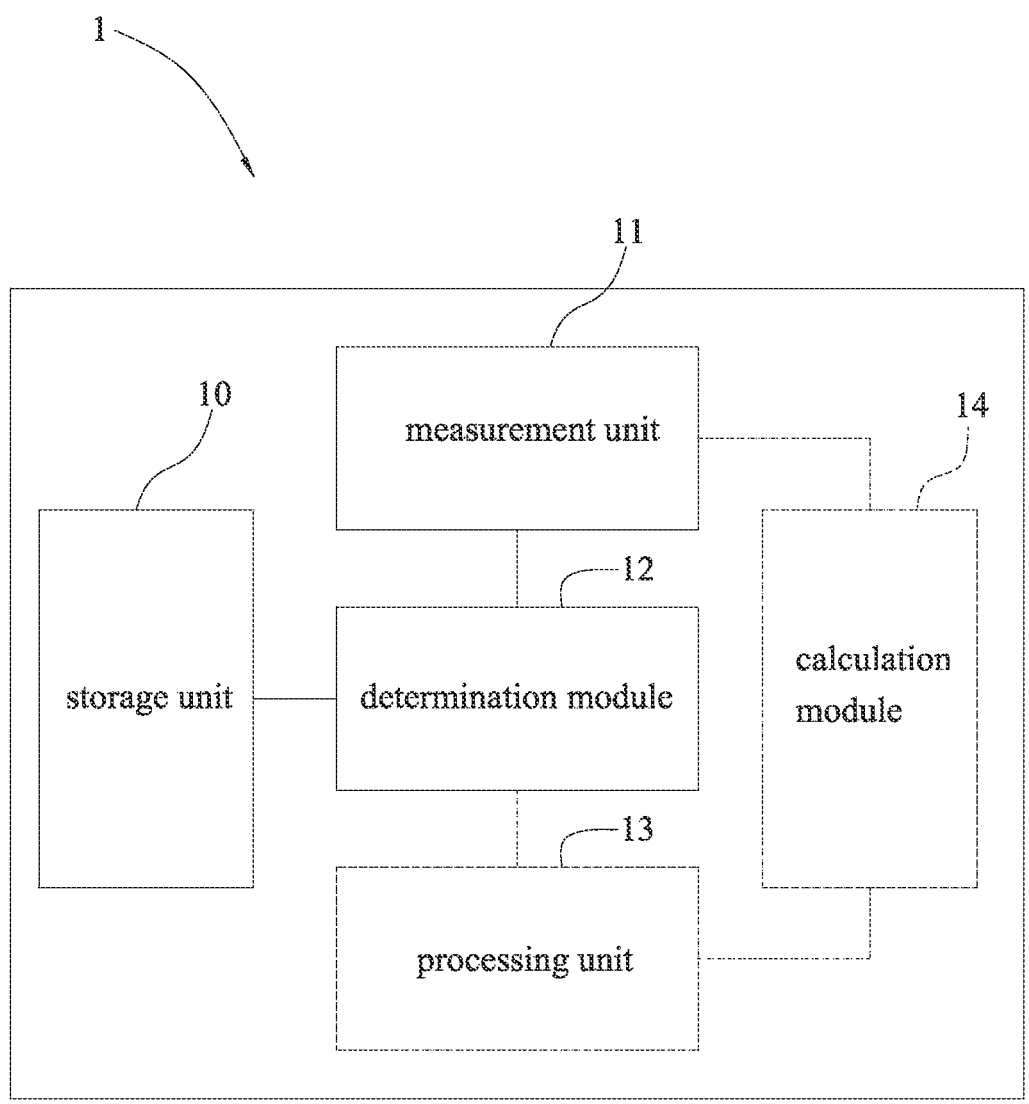
FIG. 3 is a functional block diagram of a background signal processing system according to the present invention.

FIG. 3 is a functional block diagram of a background signal processing system 1 according to the present invention. The background signal processing system 1 can be applied in a sensor device having a plurality of conductive wires. The sensor device comprises a predetermined background signal threshold. The background signal processing system 1 comprises a storage unit 10, a measurement unit 11 and a determination module 12, and a processing unit 13 or a calculation module 14, optionally.

The storage unit 10 is used to store the background signal threshold, which is determined by the background base signal.

The measurement unit 11 is used to detect the background signal measurement value of the conductive wires.

The determination module 12 is used to determine whether the background signal measurement value complies with the background signal threshold. In an embodiment, the background signal threshold can be the absolute value of two standard difference value of the background base signal. When the background signal measurement value complies with the threshold, it is indicated that the absolute value of the background signal measurement value is smaller than the threshold.

In an embodiment, the determination module 12 further generates background signal updating instructions when the background signal measurement value does not comply with the background signal threshold, indicating that the difference between the background signal measurement value and the background base signals exceeds the predetermined permissible range. The background signal processing system 1 can optionally includes a processing unit 13 that updates the background signals after receiving the background signal updating information.

In an embodiment, the background signal processing system 1 can be applied in a sensor device having a plurality of conductive wires arranged in an orthogonal manner, as shown in FIG. 1.

In an embodiment, the measurement unit 11 can be used to detect the first background signal measurement value of the first conductive wire group in the conductive wires, beginning from the $n^{th}$ conductive wire, according to the first conductive wire number interval. The determination module 12 is used to determine whether the first background signal measurement value complies with the predetermined background signal threshold, wherein n is a positive integer.

The measurement unit 11 can be used to, when the first background signal measurement value does not comply with the predetermined background signal threshold, detect the second background signal measurement value of the second conductive wire group, beginning from the $(n+m)^{th}$ conductive wire, in the plurality of conductive wires according to the first conductive wire number interval, wherein m is a positive integer.

In an embodiment, the background signal processing system 1 can optionally includes a calculation module 14, which is used to calculate the background signal speculating value of the third conductive wire group, other than the first conductive wire group and the second conductive wire group, in the conductive wires according to the first background signal measurement value and the second background signal measurement value. Since the background signal measurement value or the background signal speculating value are obtained for all the conductive wires, the noise can be filtered out during the process of capturing the touch signals, for ensuring that the signals to be captured have high precision and high quality.

In an embodiment, the calculation module 14 is used to calculate the background signal of the third conductive wire group by an interpolation method, such as Lagrange interpolation, Spline interpolation or other interpolation method, so as to obtain the background signal speculating value.

In summary, the background signal processing method and the background signal processing system according to the present invention are characterized by measuring sections of all conductive wires: the first conductive wire group to obtain the first background signal measurement value, then determining if a subsequent process is required according to first background signal measurement value, if not the remaining other detection steps can be omitted. This greatly simplifies the updating steps for background signals and reduces the workload; if subsequent processes are required, then the second conductive wire group of all the conductive wires is measured, then the second background signal measurement value obtained and first background signal measurement value obtained prior to that, are used to calculate the background signal speculating value of the third conductive wire group other than the first conductive wire group and the second conductive wire group in the plurality of conductive wires. Since only parts of the conductive wire groups but not all are required to be measured, the total workload is reduced and is able to calculate the remaining background signal speculating value of other conductive wires that are not measured, thereby capable of providing a complete background signal to ensure quality signal can be captured.

The present invention has been described using exemplary preferred embodiments. However, it is to be understood that the scope of the present invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A background signal processing method, which is used in a sensor device having a plurality of conductive wires and a predetermined background signal threshold, the background signal processing method comprising the following steps of:
   (1) detecting a first background signal measurement value of a first conductive wire group in the conductive wires according to a first conductive wire number interval, beginning from an $n^{th}$ conductive wire, wherein n is a positive integer;
   (2) determining whether the first background signal measurement value complies with the predetermined background signal threshold, if yes, stopping in this step, otherwise, proceeding to step (3);
   (3) detecting a second background signal measurement value of a second conductive wire group in the conductive wires according to the first conductive wire number interval, beginning from an $(n+m)^{th}$ conductive wire, wherein m is a positive integer; and (4) calculating a background signal speculating value of a third conductive wire group in the conductive wires according to the first background signal measurement value and the second background signal measurement value, wherein the third conductive wire group is derived by excluding the first conductive wire group and the second conductive wire group.

2. The background signal processing method of claim 1, further comprising the step of:

(5) updating a background signal of the sensor device according to the first background signal measurement value, the second background signal measurement value and the background signal speculating value.

3. The background signal processing method of claim 1, wherein the conductive wires are arranged in an orthogonal manner.

4. The background signal processing method of claim 1, wherein in step (4) the background signal speculating value of the third conductive wire group is calculated by an interpolation method.

5. A background signal processing system, which is used in a sensor device having a plurality of conductive wires and a predetermined background signal threshold, the background signal processing system comprising:

a storage unit that stores the background signal threshold;

a measurement unit that detects a background signal measurement value of the conductive wires; and a determination module that determines whether the background signal measurement value complies with the background signal threshold, wherein the measurement unit detects a first background signal measurement value of a first conductive wire group in the conductive wires, beginning from an $n^{th}$ conductive wire, according to a first conductive wire number interval, and the determination module determines whether the first background signal measurement value complies with the predetermined background signal threshold, wherein n is a positive integer, the measurement unit further detects a second background signal measurement value of a second conductive wire group in the conductive wires, beginning from an $(n+m)^{th}$ conductive wire according to the first conductive wire number interval when the first background signal measurement value does not comply with the predetermined background signal threshold, wherein m is a positive integer, and the background signal processing system further comprises a calculation module that calculates a background signal speculating value of the third conductive wire group, other than the first conductive wire group and the second conductive wire group, in the conductive wires according to the first background signal measurement value and the second background signal measurement value.

6. The background signal processing system of claim 5, wherein the determination module further generates background signal updating instructions when the background signal measurement value does not comply with the background signal threshold, and the background signal processing system further comprises:

a processing unit that updates a background signal of the sensor device after receiving the background signal updating information.

7. The background signal processing system of claim 5, wherein the conductive wires are arranged in an orthogonal manner.

8. The background signal processing system of claim 5, wherein the calculation module calculates a background signal of the third conductive wire group using an interpolation method, so as to obtain the background signal speculating value.

* * * * *

UNITED STATES PATENT AND TRADEMARK OFFICE
CERTIFICATE OF CORRECTION

PATENT NO. : 9,594,456 B2  
APPLICATION NO. : 14/577407  
DATED : March 14, 2017  
INVENTOR(S) : Lee Page 1 of 1

It is certified that error appears in the above-identified patent and that said Letters Patent is hereby corrected as shown below:

On the Title Page

Item (73) Assignee, should read:  
--IMAGINATION BROADWAY LTD.--.

Signed and Sealed this  
Fourth Day of June, 2019

Andrei Iancu  
*Director of the United States Patent and Trademark Office*